No. 656,261. Patented Aug. 21, 1900.
A. H. PARSONS.
LOW PRESSURE AIR BRAKE ALARM.
(Application filed Mar. 20, 1900.)
(No Model.)
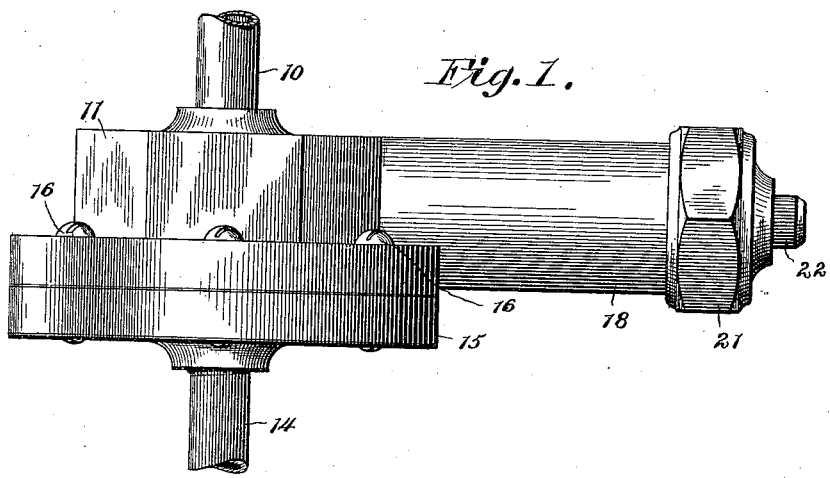
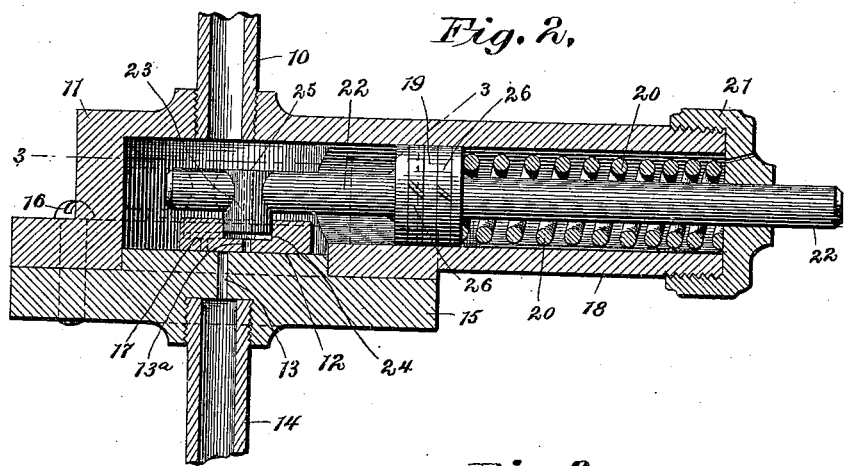
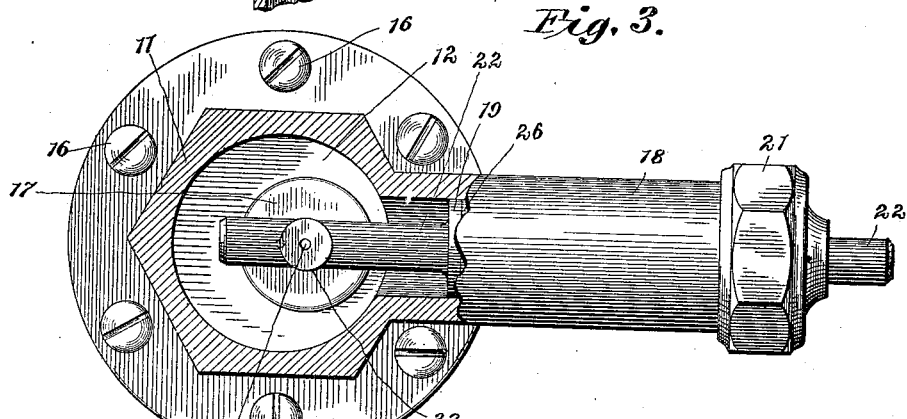
Witnesses
Howard D. Orr
A. H. Parsons, Inventor
By his Attorneys,
C. A. Snow & Co.

UNITED STATES PATENT OFFICE.

AVERY H. PARSONS, OF SOMERVILLE, TEXAS.

LOW-PRESSURE AIR-BRAKE ALARM.

SPECIFICATION forming part of Letters Patent No. 656,261, dated August 21, 1900.

Application filed March 20, 1900. Serial No. 9,445. (No model.)

*To all whom it may concern:*

Be it known that I, AVERY H. PARSONS, a citizen of the United States, residing at Somerville, in the county of Burleson and State of Texas, have invented a new and useful Low-Pressure Air-Brake Alarm, of which the following is a specification.

My invention relates to railway-brake mechanism, and particularly to a low-pressure alarm for use in connection with fluid-pressure brake mechanisms designed for operation by air, steam, water, oil, or any equivalent thereof. As ordinarily constructed, fluid-pressure brake mechanisms are operated by means of a pressure maintained or reduced in a train-pipe which is in communication with car mechanisms, including auxiliary reservoirs, brake-cylinders, &c., the reduction of train-pipe pressure to the extent of four or five pounds being necessary to adjust the parts of the triple valve to communicate auxiliary-reservoir pressure to the brake-cylinder to set the brakes and an increase of pressure in the train-pipe being necessary to release the brakes. Owing to the fact, however, that the brake-cylinders as ordinarily constructed are provided with leakage-grooves to allow the leakage of pressure from the train-pipe to escape, it is necessary to abruptly reduce the train-pipe pressure sufficiently to cause the closing of said leakage-grooves or ports, a gradual reduction of pressure through said grooves or ports not being sufficient to set the brakes. Owing to neglect upon the part of engineers it has been found in practice that accidents occur through the gradual leakage or waste of the train-pipe pressure until it is reduced to such an extent as to render the brake mechanism inefficient when required, and it has been found in practice also that the cut-out cock between the engine and the train becomes closed at times by accident, thus allowing a reduction in the system upon the cars of the train while the pressure is maintained on the engine, whereby the engineer's gage is no certain indication of the pressure which may be maintained in the train-pipe throughout the train. Therefore it is desirable, in connection with a fluid-pressure brake mechanism, to employ a signal or alarm by means of which the reduction of pressure in the train-pipe below an operative tension may be indicated not only to the engineer, but also to the train-crew, conductor, &c.; and it is the object of my invention to provide a signal or alarm device of this class which shall be of simple construction, adapted for application to any fluid-pressure brake mechanism and also which is of such construction that, while giving the alarm, when the pressure in the train-pipe is reduced to a certain predetermined tension will not allow further leakage by way of the alarm or signal mechanism after the alarm is given, or, in other words, is of such construction as to automatically give the alarm and then close the outlet to retain the pressure which is then in the train-pipe, said alarm being given without such a reduction of the train-pipe pressure as to cause the setting of the brakes.

Further objects and advantages of this invention will appear in the following description, and the novel features thereof will be particularly pointed out in the appended claims.

In the drawings, Figure 1 is a side view of a signal or alarm device constructed in accordance with my invention. Fig. 2 is a longitudinal section of the same. Fig. 3 is a detail section of a portion of the alarm device on the plane indicated by the line 3 3 of Fig. 2.

Similar reference characters indicate corresponding parts in all the figures of the drawings.

In connection with a train-pipe such as the ordinary brake-pipe, either directly or by means of a branch or suitable connection 10, as shown in the drawings, is a valve-casing 11, having a valve-seat 12, provided with a port 13, which communicates with a signal or alarm pipe 14, said port 13 being of small area, whereby the temporary opening thereof to allow a slight reduction of train-pipe pressure will not serve to cause such an abrupt reduction as to accomplish the setting of the brakes. In the construction illustrated the port 13 is formed in a casing cap or plate 15, which is secured, by means of screws 16 or other fastening devices, to the body portion of the casing 11.

Arranged upon the valve-seat 12 is a valve 17, which may be of any of the well-known types, that illustrated in the drawings being of the sliding form, and this valve, while of an area to cover the port 13 in any position which the valve may occupy upon the valve-seat, is provided at an intermediate point with a complemental signal-port 13ª, adapted for registration with the stationary signal-port 13 when the valve is at an intermediate point in its throw or occupies an intermediate position between its limits of movement in opposite directions. The casing is provided with a guide extension 18, in which operates a piston 19, which is exposed at one side to the variable fluid-pressure of the train-pipe and is exposed at the opposite side to a constant adjustable pressure, which may be applied by means of a spring 20, held at the desired tension by means of an adjustable cap 21, threaded upon the outer extremity of the guide 18. It is obvious that with the spring at a given tension a preponderating fluid-pressure in the train-pipe will cause the repression of the piston to maintain the valve 17 in the position indicated in full lines in Fig. 2, with the complemental signal-ports out of registration; whereas, a reduction of fluid-pressure in the train-pipe below that which is equivalent to the tension to which the spring is adjusted will cause the advance of the valve until the complemental signal-ports register, and thus allow the reduction of pressure from the train-pipe into the signal-pipe to sound the alarm, which may be of the whistle or other type. (Not shown and forming no part of my present invention.) The valve, however, is not retained in this adjusted position with the complemental signal-ports in registration, but is still further advanced by the pressure of the spring to cause the non-registration of said ports and the assumption by the valve of a position—for instance, such as that shown in dotted lines in Fig. 2—whereby the pressure in the train-pipe is relieved of further reduction. The illustrated connection between the piston 19 and the slide-valve, which is shown in the drawings, includes a stem 22, having a lateral lug 23, which is fitted in a socket or depression 24 in the valve, said lug terminating short of the bottom or floor of said socket to avoid the cocking of the valve and the lug being provided with a channel or port 25, by which pressure may be communicated directly to the socket and thence to the port 13ª. In the drawings, also, I have illustrated a piston having packing-rings 26 to prevent leakage of fluid-pressure; but it will be understood that this feature of the construction may be varied, as equalizing pressure upon opposite sides of the piston may be prevented by providing the guide 18 with a suitable outlet through which pressure, which passes the piston, may escape. Furthermore, it will be understood that while I have illustrated a reciprocatory piston and a slide-valve for operation by said piston as a simple and comparatively inexpensive construction adapted for the described purpose I do not desire to be limited to these specific features and, furthermore, desire it to be understood that various other changes in the form, proportion, size, and minor details of construction, within the scope of the appended claims, may be resorted to without departing from the spirit or sacrificing any of the advantages of the invention.

Having described my invention, what I claim is—

1. An alarm or signal device for fluid-pressure brake mechanisms, having a casing adapted for attachment to a train-pipe and provided with a valve-seat having a signal-port adapted for connection to a signal-pipe, a valve provided with a complemental signal-port adapted for registration with that of the valve-seat, said valve being capable of movement in opposite directions from a position wherein said signal-ports are in registration, and a valve-operating piston exposed at one side to a variable fluid-pressure controlled by train-pipe pressure, and at the other side to a constant pressure, substantially as specified.

2. An alarm or signal device for fluid-pressure brake mechanisms, having a casing adapted for attachment of a train-pipe to receive train-pipe pressure and provided with a valve-seat having a signal-port adapted for connection of a signal-pipe therewith, a valve provided with a complemental signal-port adapted for registration with that of the valve-seat, said valve being capable of movement in opposite directions from a position wherein said signal-ports are in registration, a valve-operating diaphragm exposed at one side to a variable fluid-pressure controlled by train-pipe pressure, means engaged with the opposite side of the piston for exerting constant pressure in opposition to the fluid-pressure, and means for adjusting the constant pressure means bodily to vary the position of the valve.

3. An alarm or signal device for fluid-pressure brake mechanisms, having a casing adapted for attachment of a train-pipe to receive train-pipe pressure and provided with a valve-seat having a signal-port adapted for connection of a signal-pipe therewith, a valve provided with a complemental signal-port adapted for registration with that of the valve-seat, said valve being capable of movement in opposite directions from a position wherein said signal-ports are in registration, a valve-operating piston exposed at one side to a variable fluid-pressure, a spring for applying pressure to the piston in opposition to said variable pressure, and a tension-adjusting device in operative relation with said spring, substantially as specified.

4. An alarm or signal device for fluid-pressure brake mechanisms, having a casing exposed to train-pipe pressure and provided with a valve-seat having a signal-port, a slide-valve mounted upon said seat and provided at an intermediate point with a complemental signal-port and a communicating socket, a piston exposed at one side to a variable fluid-pressure and at the opposite side to a constant pressure, and a stem actuated by said piston and provided with a lug fitted in said socket of the valve and provided with a fluid passage or channel, substantially as specified.

In testimony that I claim the foregoing as my own I have hereto affixed my signature in the presence of two witnesses.

AVERY H. PARSONS.

Witnesses:
MAE CRAINE,
JAS. POLLARD.